Figure 1:
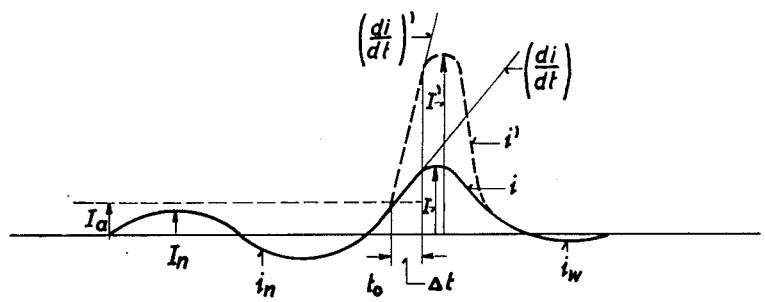

Aug. 12, 1952        F. KESSELRING        2,607,029

OVERLOAD LIMITING MEANS FOR ELECTRIC CIRCUITS

Filed April 24, 1947

INVENTOR
*Fritz Kesselring.*

BY Curt M. Avery

ATTORNEY.

Patented Aug. 12, 1952

2,607,029

UNITED STATES PATENT OFFICE 2,607,029

OVERLOAD LIMITING MEANS FOR ELECTRIC CIRCUITS

Fritz Kesselring, Zollikon-Zurich, Switzerland, assignor to FKG Fritz Kesselring, Gerätebau Aktiengesellschaft, Bachtobel-Weinfelden, Switzerland, a Swiss company Application April 24, 1947, Serial No. 743,685
In Switzerland April 29, 1946

5 Claims. (Cl. 323—9)

My invention relates to automatic means for limiting overload currents in electric circuits such as power transmitting lines.

It has been proposed to provide electric circuits, especially power lines in which steep-wave short circuit currents may occur, with current-limiting devices which, in response to such currents, insert impedance means into the circuit so rapidly and of such an impedance magnitude that the maximum current is limited to three to five times the rated current value of the circuit or line thus protected. However, in the event of extremely high short-circuit impulses it may happen that within the release interval, i. e. the time elapsing from the initial moment of the disturbance until the beginning insertion of protective impedance, the current increases so far beyond the responsive current value of the limiting device that a proper insertion of the impedance means is difficult or virtually impossible. The possibility of such excessive initial values of fault currents also requires large dimensions of the limiting device and correspondingly large costs of the equipment, and it is necessary, as a rule, to apply a similarly ample rating to other circuit elements, such as the transformers, machines and switching equipment, connected to the line.

It is an object of my invention to provide current-limiting devices that are free of the above-mentioned short-comings of the known current-limiting means of this kind. More particularly, my invention aims at devising current-limiting means that secure a proper insertion of impedance in a power transmission circuit while safeguarding against the occurrence of excessive short-circuit current surges and without requiring inconveniently large dimensions and correspondingly costly designs of the protective equipment. Another object of my invention, related to those mentioned, is to provide power transmission circuits that are inherently protected from the occurrence of fault currents above a predetermined safe value of relatively low magnitude so that the transformers, machines and other devices to be connected with the circuit can be given a rating lower than that heretofore required for reasons of safety.

In order to achieve these objects, and in accordance with my invention, I connect with the circuit to be protected a current-biasing inductance means in combination with a current-limiting impedance device whose impedance becomes effective in response to the occurrence of an overload current, and I rate the electric characteristics of the inductance means in relation to the time constant of the current-responsive control means of the impedance device so that the instantaneous value to which the current can possibly build up, during the period from the initial moment of the disturbance to the starting moment of impedance insertion (release interval), remains below a given value above the release current value of the control means and below the safe current limit for switching the impedance means. As a result, the impedance increase is always started under suitable current conditions. According to a more specific feature of the invention, the inductance means are rated so that the maximum to which the instantaneous current value can increase during the release interval is at most twice the release current value of the impedance control means. Depending upon the prevailing operating conditions or desiderata, it may be preferable to rate the inductance so large that during the release interval the overload current increases to only about 1.3 times the value of the releasing current. Referring, for instance, to impedance control means with a release interval in the order of $10^{-4}$ seconds, the inductance means are preferably dimensioned for a rate of current increase of at most $5 \times 10^6$ amperes per second.

In general, the inductance value required for the purpose of the invention, can readily be provided by applying properly rated choke coils. For instance, air-core reactance coils may be used to advantage. Iron-cored reactor coils are also applicable, and the core may then be provided with one or several air gaps. When using iron-cored reactors the magnetic characteristics, according to another feature of the invention, may also be rated in relation to the performance of the impedance control means of the current-responsive device, so that the reactor core can saturate only near the end, or after, the release interval of the control means. It is further possible, especially when incorporating the invention in new circuit installations, to embody the additional inductance within otherwise necessary circuit elements such as machines and transformers, for instance by providing the circuit element with a correspondingly increased stray field.

According to another feature of the invention, I design and control the current-responsive control means of the impedance device so that it responds to a given release current value as well as to the occurrence of an excessive rate of current increase.

Figure 2:
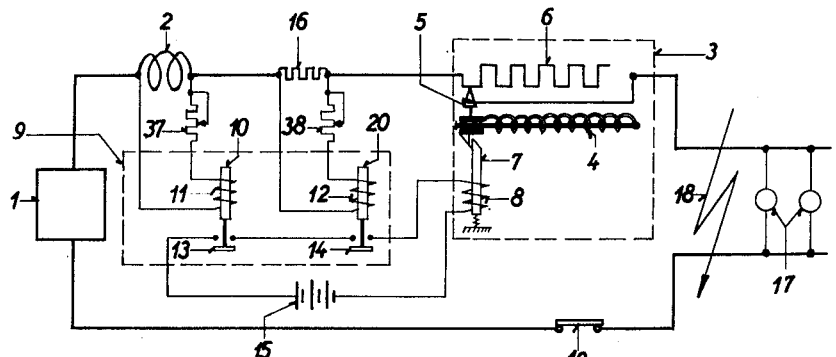

These and other objects and features of my invention will be apparent from the following description taken in conjunction with the drawing in which Figure 1 shows schematically a current-time diagram explanatory of the performance of devices according to the invention, while Fig. 2 shows a circuit diagram of an example of a power transmission circuit according to the invention.

In the current-time diagram of Fig. 1, the curve $i_n$ represents the instantaneous values of the rated current, $I_n$ the maximum value of the rated current, and $I_a$ the release current value of a current-limiting impedance device i. e. the value of current at which the current-responsive control means of the device initiate an impedance-increasing operation. Assume that a short circuit occurs at the moment $t_0$. Normally, the current would increase along the broken curve $i'$ up to the maximum value $I'$, and under these conditions the instantaneous current $i'$ would increase so rapidly that its value at the end of the release interval $\Delta t$ is a large multiple of the release current value $I_a$ of the current-limiting impedance device. Due to the series inductance according to the invention, however, the rate of current increase is reduced from the otherwise expectable value $$\left(\frac{di}{dt}\right)'$$

to the value $$\left(\frac{di}{dt}\right)$$

Hence, the maximum value of the overload current amounts only to $I$, and the instantaneous current $i$ at the end of the release interval $\Delta t$ has reached at most double the value of the release current $I_a$. After the increase of circuit impedance, starting at the end of the release interval $\Delta t$, the current is reduced to the value $i_w$ which is small enough to readily permit opening the circuit.

In Fig. 2, numeral 1 denotes a current source, such as a generator or power station, which feeds a power supply circuit or line equipped with current limiting means comprising an inductance means 2, here shown as a choke coil, in series connection with a current-limiting impedance device 3. Device 3 has a spring 4 which is normally stressed and, when released, moves a contact assembly 5 along a resistor 6 and then very rapidly inserts the resistor into the load circuit. The contact assembly is normally locked in the illustrated position by a magnetically actuable latch 7 whose control coil is denoted by 8. An appertaining relay 9 has two cores 11 and 20 with coils 11 and 12 which operate to close the normally open contacts 13 and 14 when the excitation in each coil exceeds a given value. Contacts 13 and 14, when closing, connect a suitable source of current, here shown as a battery 15, to coil 8. Coil 12 is connected across a series resistor 16 of the load circuit, while coil 11 is connected across choke coil 2. The load of the power circuit is represented at 17. Arrow 18 denotes the location of a short circuit capable of resulting in a steep-wave current surge of extremely high magnitude.

The device operates as follows. Under normal operating conditions, i. e. at rated current, the inductive reactance of choke coil 2 is virtually negligible, the voltage across coil 2 is also small, and coil 11 has little or no appreciable effect. The voltage across resistor 16 is proportional to the load current, and the control coil 12 is so rated that normally it will not respond to that voltage. If at the moment $t_0$ (Fig. 1) a short occurs at 8 (Fig. 2), the current increases to a value above that required to cause coil 12 to close contact 14, and the increase occurs at such a rapid rate that the choke coil 2 assumes momentarily a high reactance and causes a correspondingly high voltage to appear across coil 11 which operates in closing the contact 13. Hence, both the high current value and the high rate of current increase are effective in this arrangement to release the current limiting impedance device 3. At the end of the release interval $\Delta t$ (Fig. 1) of, for instance, about $10^{-4}$ second, the contact assembly 5 is released. At that moment, as explained above, the current is not higher than at most twice the value $I_a$ that would be required for coil 12 to close the contact 14. Since the current value $2I_a$ is safe for a trouble-free insertion of impedance, the limiting device 3 can be relied upon to securely reduce the current to the low value $i_w$ (Fig. 1) which can readily be controlled by a circuit breaker or disconnect switch schematically represented at 19 (Fig. 2).

Aside from improved safety of performance, a current-limiting system according to the invention, as exemplified by the above-described embodiment, safeguards against the possibility of currents above the predetermined maximum. Thus, in the foregoing example, the choke coil, impedance coil, and all load and control devices appertaining to the circuit cannot be exposed to a current higher than the value $I$ (Fig. 1) which need be only moderately higher than the rated current. The significance of this fact, in economic and engineering respects, will be readily apparent if one considers that dynamic as well as thermic stresses increase with the square of the current. Consequently, the coke coil or other inductance means required for the invention is exposed to only a small percentage of stress for which customary reactance coils must be designed. Hence the size of the coil may be relatively small. The other components of the current-limiting system, of course, may also be given relatively small dimensions in view of the limited duty imposed on them. As a matter of fact, the entire circuit arrangement, including all machines, transformers and the like devices need be rated only for the reduced maximum current so that a considerable over-all improvement is afforded.

The advantages of connecting, in accordance with the invention, a current limiting device with additional inductance means, as compared with known current limiting devices of correspondingly larger current carrying capacity, are highly significant, in engineering and commercial respects, for the design and introduction of so-called short circuit free lines or networks. Some of the outstanding advantages essential in these respects are the following. The switching of the impedance means can be carried out more readily and safely because the instantaneous current values, at which the switching occurs, is reduced considerably. The thermic and dynamic stresses of the impedance means, especially if these means are designed as ohmic resistors, is greatly reduced thus affording a more economical construction and reduced space requirements of the current limiting apparatus. The maximum current value can be further reduced, without leading to unduly high voltage increases due to too rapid switching of the impedance means. The additional inductance means, such as choke coils, need be rated only for this reduced maximum current so that the choke coils can be given a small and relatively cheap design. As a further result, the voltage drop, occurring across the traditional inductance means due to the rated current, is readily kept within permissible limits. It will, therefore, be recognized that the invention combines a large number of various advantages which jointly contribute to providing an advance of exceptional magnitude in this art. As a matter of fact, for power circuits, lines or networks of moderate voltage (up to about 20 kilovolts) and high short circuit currents, the heretofore unsolved task of creating circuits free of short-circuit currents has now become possible by virtue of the combination according to the invention.

It will be obvious to those skilled in the art, that systems according to my invention can be modified and altered in various respects and may be embodied in devices and circuits other than that specifically illustrated and described herein, without departing from the objects and essential features of the invention and within the scope of the claims annexed hereto.

I claim:

1. Current-limiting means, comprising an electric circuit, a current-limiting device having normally ineffective impedance means for limiting excessive current in said circuit when effective, inductance means series connected in said circuit so as to reduce the rate of increase of said excessive current, control means connected with said impedance means and having two control coils, resistance means series-connected in said circuit to provide a voltage proportional to said current, one of said coils being connected across said resistance means and said other coil being connected across said inductance means for causing said control means to render said impedence means effective when the voltages of said two coils simultaneously exceed given respective values.

2. Current-limiting means, comprising an electric circuit, a current-limiting device having normally ineffective impedance means for limiting excessive current in said circuit when effective, inductance means connected in said circuit and capable of reducing the rate of increase of said excessive current, control means connected with said impedance means for rendering it effective and having two control circuits, resistance means series-connected in said circuit to provide a voltage proportional to said current, one of said control circuits being connected across said resistance means and said other control circuit being connected across said inductance means so that said control means responds when both voltages of said two coils exceed given respective values, and adjusting means disposed in at least one of said control circuits for adjusting the ratio of the control effects of said control circuits.

3. Current-limiting means, comprising a load circuit, a current-limiting device having impedance means and releasable control means for inserting said impedance means into said load circuit, said control means having a relay with two control circuits, resistance means disposed in said load circuit to provide a voltage drop dependent upon the current in said load circuit one of said control circuits being connected across said resistance means, and inductance means series-arranged in said load circuit to provide a voltage dependent upon change of said current, said other control circuit being connected with said inductance means to be controlled by said voltage, whereby said control means are released in response to the magnitude and rate of increase of overload current.

4. Current-limiting apparatus, comprising an electric circuit for alternating current, normally ineffective impedance means connected with said circuit for limiting said current, an inductive reactor series-connected in said circuit and having an unsaturated inductance characteristic up to a given overload value of said current, voltage-responsive switching means connected with said impedance means for rendering, when responding, said impedance means effective within a given switching interval smaller than the half-wave period of said current, said reactor having an inductance rated for preventing said current to exceed said overload value within said interval, and said switching means having a control circuit connected across said reactor in order to respond when the rate of current increase exceeds a given magnitude.

5. Current-limiting apparatus, comprising an alternating-current circuit subject to overload, normally ineffective impedance means connected with said circuit for limiting said overload, an air-core inductance coil series connected in said circuit, voltage-responsive switching means connected with said impedance means for rendering, when responding, said impedance means effective within a given switching interval smaller than the half-wave period of said current, said coil having an inductance rated for limiting said overload to a given value within said interval, and said switching means having a control circuit connected across said coil in order to respond when the rate of change of said overload exceeds a given magnitude.

FRITZ KESSELRING.

REFERENCES CITED

The following references are of record in the file of this patent:

UNITED STATES PATENTS

| Number | Name | Date |
|---|---|---|
| 816,468 | Hewlett | Mar. 27, 1906 |
| 1,287,233 | Chubb | Dec. 10, 1918 |
| 1,344,713 | Peters | June 29, 1920 |
| 1,433,712 | Fortescue | Oct. 31, 1922 |
| 1,571,304 | Sineband | Feb. 2, 1926 |
| 1,834,832 | Flandrin | Dec. 1, 1931 |
| 2,261,686 | Kesselring | Nov. 4, 1941 |
| 2,316,710 | Kesselring et al. | Apr. 13, 1943 |